Figure 1:
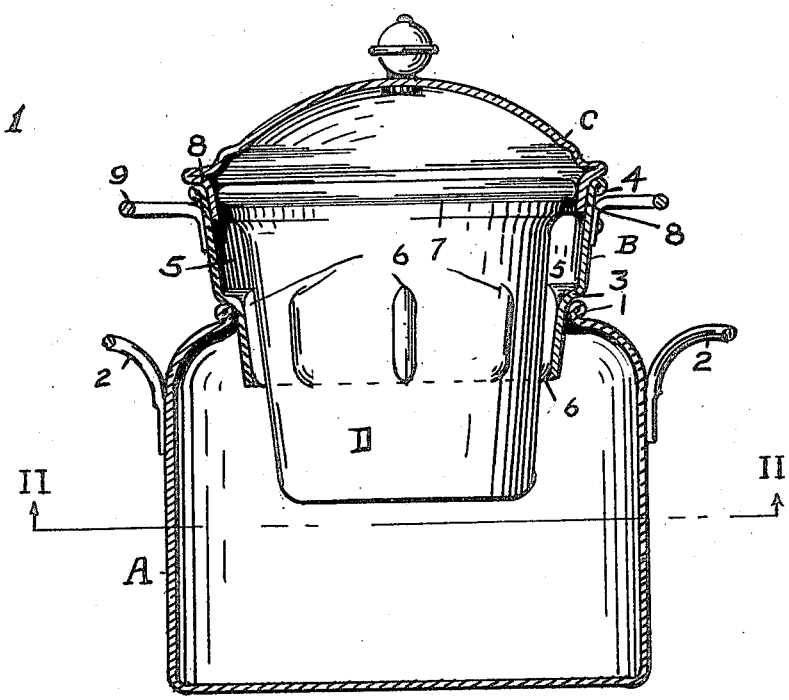

H. C. BIETTE.
COOKING UTENSIL.
APPLICATION FILED NOV. 11, 1920.

1,383,972.

Patented July 5, 1921.
2 SHEETS—SHEET 1.

WITNESS
T. F. Dilworth

INVENTOR
Henry C. Biette,
by Edward A. Lawrence
his attorney.

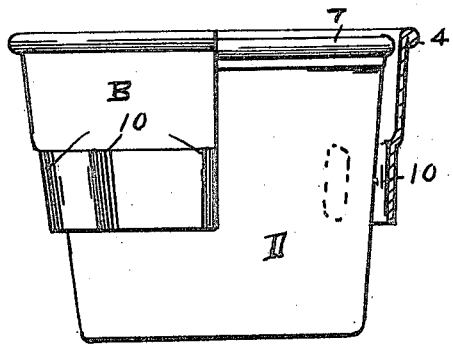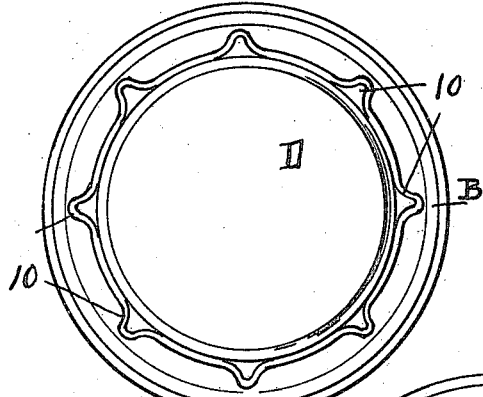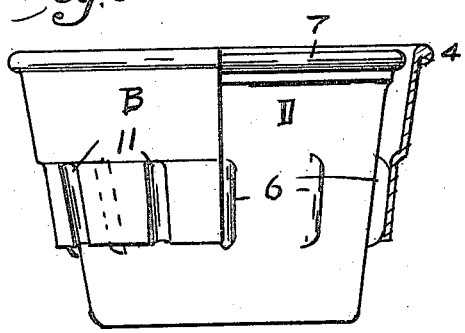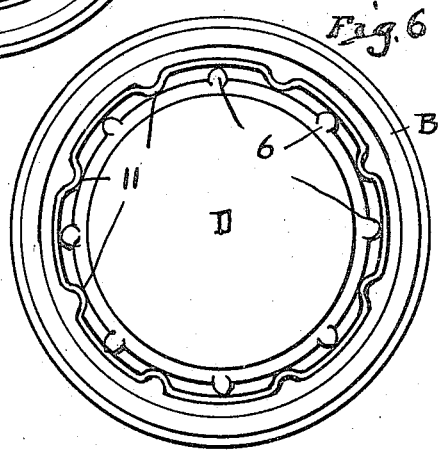

UNITED STATES PATENT OFFICE.

HENRY C. BIETTE, OF PITTSBURGH, PENNSYLVANIA, ASSIGNOR OF TWO-THIRDS TO J. AUDLEY PIERCE, OF McKEESPORT, PENNSYLVANIA.

COOKING UTENSIL.

1,383,972.  Specification of Letters Patent.  Patented July 5, 1921.

Application filed November 11, 1920. Serial No. 423,257.

*To all whom it may concern:*

Be it known that I, HENRY C. BIETTE, a citizen of the United States, and residing in the city of Pittsburgh, in the county of Allegheny and State of Pennsylvania, have invented or discovered a new, useful, and Improved Cooking Utensil, of which the following is a specification.

My invention consists in certain new and useful improvements in cooking utensils, and more particularly relates to the type of utensils known as "steamers" or "double boilers," wherein the food to be cooked is contained in an inner vessel suspended in an outer vessel which contains water to be brought to the boiling point.

Usually in the case of utensils of this type, the upper portion of the inner vessel fits snugly within the outer vessel, with the result that the live steam from the outer vessel is prevented from coming into direct and cooking contact with the upper walls of the inner vessel, but can only reach the bottom and lower sides of the latter. Thus the upper contents are not cooked by the direct application of heat, but are affected only indirectly by the radiation of heat from the lower portion of the inner vessel and its lower contents. Therefore it is necessary to unduly increase the depth of the inner vessel to enlarge the proportion of its wall surface directly exposed to the steam. This results in decreasing the available water capacity, so that where prolonged cooking is necessary, as in the case, for instance, of raw oatmeal, the utensil must be watched to prevent its "boiling dry," and the water must be replenished at least once during the cooking operation. Moreover, the upper contents of the inner vessel cannot be thoroughly cooked unless stirred at proper intervals. Again, in the case of a steam cooker of this character where water is introduced into the inner vessel with the food product, such as cereal, after the food has been cooked and allowed to stand before serving, free water collects on top of the food, showing that the cereal and the water have not been homogeneously combined in the cooking.

It is true that steam cookers have been designed wherein steam from the outer vessel is admitted into the interior of the inner vessel, but this construction does not solve the difficulty, but rather complicates the same, as the admission of live steam into the inner vessel is objectionable in connection with the cooking of many kinds of foods.

The object which I have in view is the provision of a steam cooking utensil wherein the live steam from the outer vessel will come into direct contact with substantially the entire wall surface of the inner vessel, but without gaining access to the interior of the latter. I have found that this arrangement is much more satisfactory than the prior art structures above referred to, insomuch as the contents of the inner vessel are thoroughly and uniformly cooked without becoming soggy, and such food, when allowed to stand will not separate from its water content, as evidenced by free water collecting above the food. I have found, moreover, that in the case of cereals, the proper quantities of the cereal and water may be placed in the inner vessel and perfectly cooked into a homogeneous mass without even preliminary stirring.

In my pending patent application, Serial Number 409,623 filed September 11th, 1920, I show one method of obtaining such advantageous results, the inner vessel being suspended in the outer vessel by means of a steam ring which is ported to permit the upward passage of steam about the upper walls of the inner vessel, the top of the inner vessel being closed against the entrance of such steam into the interior of said vessel.

In my present invention I provide for the upward passage of the steam in direct contact with the wall of the inner vessel by means of passages or ports interposed between the steam ring and the wall of said vessel, thereby lessening the cost of manufacturing, and also holding the steam in direct cooking contact with the wall of the inner vessel as it ascends.

In my present invention I prefer to close the inner vessel against the entrance of the ascending steam, as in my above mentioned patent application, but my improved method of permitting the upward flow of steam in close contact with the wall of the inner vessel may be applied to steam cookers wherein said steam is admitted to the inner vessel.

Figure 2:
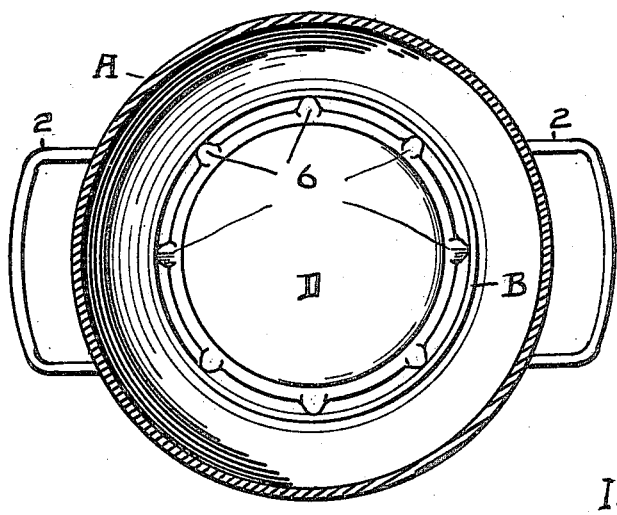

In the accompanying drawings, in which are illustrated various embodiments of the principles of my invention, Figure 1 is a vertical section of a steam cooker embodying the principles of my invention; Fig. 2 is a horizontal section looking upwardly from the dotted line II—II in Fig. 1; Fig. 3 is an elevation of a steam ring and inner vessel illustrating a modification, the steam ring being partially broken away to show the wall of the inner vessel; Fig. 4 is an inverted plan view of the same; Fig. 5 is a view similar to Fig. 3 but showing a further modification, and Fig. 6 is an inverted plan view of the same.

The following is a detailed description of the drawings, reference being first had to Figs. 1 and 2.

A represents the outer vessel which may be of the usual design for such containers, being provided with a beaded top edge 1 and one or more suitable handles 2.

B is the steam ring, preferably stamped or otherwise formed of metal and having intermediate of the height an annular shoulder 3 which rests on the edge 1 of the vessel A to support the ring B in place. The ring B extends above the vessel A and has an upper beaded edge 4 upon which the lid C rests. In the drawings the top diameter of the ring B is somewhat greater than that of the vessel A, the upper or exposed portion of the ring B flaring outwardly, but if desired, the said diameters may be equal, thus enabling the lid C to be used as a lid for the vessel A when the steam ring and inner vessel D are removed.

The lower portion of the steam ring B depends within the vessel A and is thus of less diameter than the upper portion of said ring B, and preferably tapers or contracts downwardly within said vessel A.

D is the inner vessel which may be of metal, enamel ware, pottery or, as I regard preferable, of heat resisting glass.

Said vessel is preferably downwardly tapered and its top edge, when said inner vessel is in position, extends up to at least within a relatively short distance below the top of the ring B.

Said vessel is supported by the ring B in such a manner that the steam from the vessel A will ascend up along the wall of the vessel D into the annular chamber 5 formed between the upper portions of the steam ring and of the vessel D.

Thus in Figs. 1 and 2 I have shown the exterior of the vessel D provided with a circumferentially arranged series of vertically disposed integral ribs 6 which conform to the taper of the lower portion of the ring B, and thus support the vessel D in place.

I prefer to bead the top edge of the vessel D as at 7 to contract the annular space between the tops of the steam ring and the said vessel, so that such space may be occupied and substantially sealed by the depending, annular rib 8 in the under side of the lid C, thus preventing the steam from the vessel A entering the interior of the vessel D, at least in sufficient quantities to injuriously affect the operation of cooking the contents of the inner vessel.

I prefer to provide the steam ring with one or more handles 9 so that the ring and the inner vessel may be lifted off and on together.

In Figs. 3 and 4, I show the exterior wall of the vessel D plane or unribbed, the lower portion of the ring B being crimped vertically, as at 10 around its annular extent so that while the lower portion of said ring fits around and supports the vessel, such crimpings form vertical passages spaced around the vessel for the upward passage of steam in close contact with the wall of the vessel.

In Figs. 5 and 6, I show the lower portion of the ring B provided with an annular series of vertically disposed ribs 11 and the vessel D provided with the ribs 6, so that while the ring supports the vessel in place, steam passages are formed between the ring and the vessel for the upward travel of the steam in intimate contact with the wall of vessel D.

In all of these forms or structures the currents of steam are held in direct contact with the wall of the vessel D, so that the full heating effect of the steam is realized. Therefore less water need be evaporated, and consequently less fuel, such as expensive gas, is required; such an extremely hot fire is not required, and furthermore the cooking operation is greatly expedited.

What I desire to claim is:—

1. A cooking utensil comprising an outer vessel adapted to contain water, a steam ring mounted on said outer vessel, an inner vessel suspended by means of said steam ring partially within said outer vessel, passages being provided between said ring and said inner vessel whereby the steam will ascend from said outer vessel in direct contact with the wall of said inner vessel and means for inclosing the tops of said steam ring and said inner vessel from atmosphere and from each other.

2. A cooking utensil comprising an outer vessel adapted to contain water, a steam ring mounted on said outer vessel and extending above the same, an inner vessel mounted in said steam ring and partially depending within said outer vessel, an annular chamber being formed between the upper portions of said steam ring and said inner vessel, passages being provided between said steam ring and said inner vessel whereby the steam will ascend in close contact with the wall of said inner vessel from said outer vessel into said annular chamber, and means for closing the upper end of said annular chamber to prevent said steam entering said inner vessel.

Signed at Pittsburgh, Pa., this 8th day of November, 1920.

HENRY C. BIETTE.